Jan. 26, 1960 D. R. BUSS 2,922,247
FISH HOOK ASSEMBLY
Filed Aug. 30, 1955
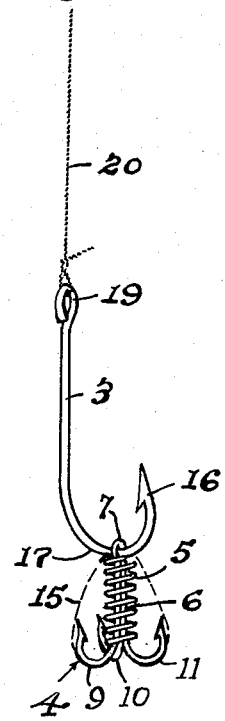
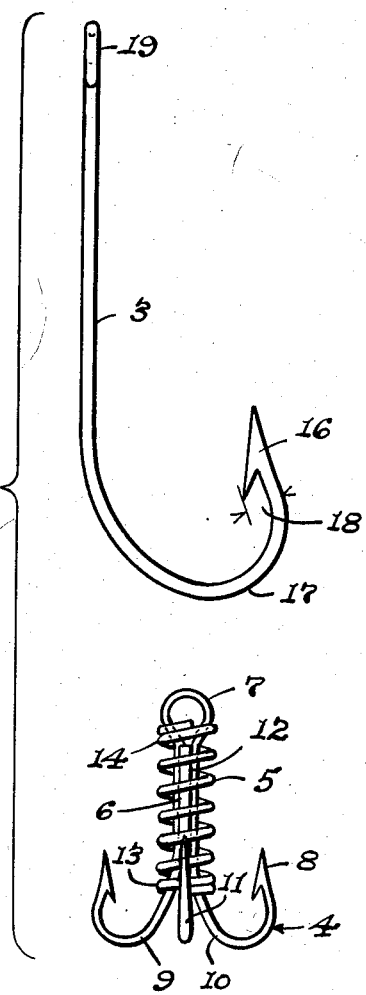
Inventor
Donald R. Buss

United States Patent Office 2,922,247
Patented Jan. 26, 1960

2,922,247

FISH HOOK ASSEMBLY

Donald R. Buss, Lanark, Ill.

Application August 30, 1955, Serial No. 531,428

1 Claim. (Cl. 43—44.8)

This invention relates to a new and improved fish hook assembly.

The principal object is to provide a fish hook assembly combining in a novel way a larger hook and a smaller treble hook having on the shank thereof a coiled spring as a bait anchorage element, the attaching eye of the treble hook being applied to the bail of the larger hook so that the spring serves to retain the treble hook in dependent relation to the bail of the larger hook and also to prevent withdrawal of the barb on the larger hook from the eye of the treble hook. When a prepared dough-like or paste form of bait is used, such as is especially recommended in fishing for catfish and certain other kinds of relatively small fish, the treble hook in the present assembly will serve to catch such fish while the bait is disposed close enough to the larger hook to enable catching larger game fish with it, so that a fisherman's chances of catching fish are, therefore, greatly improved, and, occasionally, a smaller fish caught on the treble hook may serve as the bait for a larger game fish.

In the treble hook, the attaching eye is slightly larger in outside diameter than the inside diameter of the coiled spring and in assembling the spring on the shank of the treble hook the coils have to be radially expanded slightly as they are pressed down one after another over the eye onto the shank, thus eliminating an extra soldering or welding operation, and at the same time insuring closer uniformity in the product in quantity production. The coiled spring is moreover slightly longer than necessary to reach from the eye to the point on the shank where the spring bears against the three branches of the treble hook, and it is, therefore, necessary to compress the spring endwise to a certain extent to get the last coil or two over the eye, and in that way the spring is held caged on the shank under a predetermined compression and will not, therefore, be apt to get loose and shift its position with respect to the shank but will always remain substantially in coaxial relationship thereto, which is advantageous from the standpoint of bait retention.

The invention is illustrated in the accompanying drawing, in which—

Fig. 1 is a side view of the fish hook assembly of my invention shown substantially full size, and Fig. 2 is a disassembled side view of the two hooks on a larger scale with the treble hook turned so as to give a better idea of its construction and the normal relationship of the coiled spring thereon to the shank and eye prior to assembly of the relatively small treble hook on the bail of the larger hook.

The same reference numerals are applied to corresponding parts in the two views.

Referring to the drawing, the reference numeral 3 designates a conventional large size fish hook, while the reference numeral 4 designates the smaller treble hook generally, and 5 the coiled spring that is assembled on the shank 6 thereof below the attaching eye 7 and spaced radially from the barbs 8 enough to avoid interference with the impalement of a small fish on one or more of these barbs. Two branches 9 and 10 of the treble hook are formed from one piece of spring wire with the eye 7, as clearly appears in Fig. 2, the third branch 11 being formed by another piece of the same kind of wire and having its upper end portion soldered between the upper end portions of the other two branches, as indicated at 12. The three branches 9, 10 and 11 lie in planes at 120° to one another and hence three-point support is provided on these three branches for the lower end portion 13 of the coiled spring 5 for support of the lower end of the spring normal to the axis of the shank 6 and in concentric relation thereto. The upper end portion 14 of the spring abuts against the bottom of the eye 7 and in that way the spring is held against endwise movement in either direction, and, inasmuch as the eye 7 is circular in form and is disposed diametrically relative to the upper end portion 14 of the spring, it is obvious that the upper end portion 14 of the spring will likewise be held normal to the axis of the shank 6 and in concentric relation thereto. The outside diameter of the eye 7 is slightly larger than the inside diameter of the spring 5 so as to enable assembling the spring on the shank 6 without the necessity for a separate soldering or welding operation, the spring being merely forced endwise over the eye 7 onto the shank 6, the coils being caused to expand radially enough to slip over the eye in this assembling operation. The coils, of course, immediately contract again to their normal diameter after passing over the eye 7, so that the spring is thereby held in its assembled position. Furthermore, the spring 5 is slightly longer than necessary to reach from the point of engagement of the lower end portion 13 on branches 9—11 to the point of engagement of the upper end portion 14 on the bottom of the eye 7 and consequently, in assembling the spring 5 on the shank 6, the spring has to be compressed endwise enough to get the last one or two coils of the upper end portion 14 over the eye 7. The spring 5 is, therefore, held resiliently in engagement with the branches 9—11 at one end and in engagement with the bottom of the eye 7 at the other end and will not be apt to get loose and shift about on the shank 6 but will remain substantially concentric with the shank. Close uniformity in quantity production of these treble hooks is, therefore, made possible by this construction.

Bait of prepared doughlike or paste form is usually applied to the hook in the form of a pear-shaped wad as indicated in dotted lines at 15 in Fig. 1, and it fills up and adheres to the spring 5 so as to be mechanically anchored to the shank 6 in proper relation to the barbs 8 which are usually disposed close to the surface of the wad 15 to take hold the instant the fish bites. The wad 15 will, of course, be of a diameter to take in all three barbs of the treble hook.

The barb 16 on the end of the bail 17 of the large hook 3 is of a width across its inner end, as indicated at 18 in Fig. 2, to pass freely through the eye 7 one way, namely, in assembling the treble hook 4 onto the bail 17 of hook 3, but in this assembling operation the spring 5 is compressed slightly to provide clearance for the wide inner end of the barb 16. Hence, the treble hook is retained in dependent relation to hook 3 on bail 17 by spring 5 and the spring positively prevents withdrawal of the barb 16 through the eye 7. On the other hand, the fisherman may easily enough remove the treble hook 4 from the bail of the larger hook 3 by simply compressing the spring 5 enough to dispose the upper end coils 14 in retracted relationship to the eye 7 when, of course, the barb 16 can pass freely through the eye.

In operation, the hook assembly composed of hooks 3 and 4 assembled, as shown in Fig. 1, is attached by means of the eye 19 on hook 3 directly to a line 20. The bait 15 applied to hook 4 serves for both hooks, and, as stated before, the chances of catching fish of all sizes are greatly improved with this assembly, because catfish and other small fish can be caught on the treble hook 4, and the chances of catching larger game fish are just as good or better with this assembly as compared with other baits and hooks. Furthermore, the added snagging action of the treble hook makes it less likely that a large fish can spit out the bait.

It is believed the foregoing description conveys a good understanding of the objects and advantages of my invention. The appended claims have been drawn to cover all legitimate modifications and adaptations.

I claim:

For assembly removably on the lower bail portion of a relatively larger fish hook, behind the barb on the end thereof, for suspension from said bail portion, a relatively smaller treble fish hook having a shank terminating at its upper end in a closed loop defining an eye through which the barb on the bail portion of the larger hook is adapted to be passed freely to hang the smaller hook on said bail portion, and means on the shank of the smaller hook for holding a pear-shaped wad of plastic bait material in proper relation to the barbs of the treble hook, said means being movable to and from a position relative to the eye where it retains the smaller hook in dependent relation to the bail of the larger hook and acts as a brake by frictional engagement on said bail to restrict freedom of movement of the smaller hook relative to the larger hook and prevents withdrawal of the larger hook's barb through the eye, said means comprising a coiled compression spring slightly smaller in diameter than the eye on said smaller fish hook encircling the shank of said smaller fish hook and supported thereon by engagement of the lower end of the spring on the bail portions of the treble hook so that the upper end of said spring engages the bail portion of the larger hook with enough pressure to hold the smaller fish hook in dependent relation while eclipsing enough of the circle of the eye of the smaller fish hook to provide the brake action by frictional engagement on the bail of the larger hook and prevent withdrawal of the larger fish hook's barb through the eye until the spring is compressed endwise enough to withdraw the upper end of the spring to a retracted position relative to said eye, said eye retaining the spring on said shank when said smaller treble fish hook is removed from said larger fish hook.

References Cited in the file of this patent

UNITED STATES PATENTS

| | | |
|---|---|---|
| 13,649 | Johnson | Oct. 9, 1855 |
| 772,333 | Biersach | Oct. 18, 1904 |
| 2,054,976 | Gould | Sept. 22, 1936 |
| 2,281,809 | Smith | May 5, 1942 |
| 2,513,548 | Buss | July 4, 1950 |
| 2,514,527 | Verhota | July 11, 1950 |
| 2,590,558 | Mickelson | Mar. 25, 1952 |

FOREIGN PATENTS

| | | |
|---|---|---|
| 148,178 | Austria | 1936 |
| 521,418 | Belgium | of 1953 |
| 1,085,713 | France | 1954 |